United States Patent
Chen et al.

(10) Patent No.: US 12,452,737 B2
(45) Date of Patent: Oct. 21, 2025

(54) METHOD FOR DETERMINING RESOURCE UTILIZATION RATE, COMMUNICATION DEVICE AND STORAGE MEDIUM

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventors: Ningyu Chen, Beijing (CN); Xin Li, Beijing (CN); Wenlin He, Beijing (CN); Wei Deng, Beijing (CN); Jianhui Mao, Beijing (CN); Le Wang, Beijing (CN); Wen Fan, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 0 days.

(21) Appl. No.: 18/697,100

(22) PCT Filed: Sep. 28, 2022

(86) PCT No.: PCT/CN2022/122216
§ 371 (c)(1),
(2) Date: Mar. 29, 2024

(87) PCT Pub. No.: WO2023/051630
PCT Pub. Date: Apr. 6, 2023

(65) Prior Publication Data
US 2024/0405809 A1 Dec. 5, 2024

(30) Foreign Application Priority Data
Sep. 29, 2021 (CN) .......................... 202111151553.3

(51) Int. Cl.
*H04B 7/0413* (2017.01)
*H04L 5/00* (2006.01)
*H04W 28/10* (2009.01)

(52) U.S. Cl.
CPC .......... *H04W 28/10* (2013.01); *H04B 7/0413* (2013.01); *H04L 5/0092* (2013.01)

(58) Field of Classification Search
CPC ..... H04W 28/10; H04L 5/0092; H04B 7/0413
See application file for complete search history.

(56) References Cited

U.S. PATENT DOCUMENTS

2024/0032018 A1* 1/2024 Ramachandra ....... H04L 5/0023

FOREIGN PATENT DOCUMENTS

| CN | 101820669 A | 9/2010 |
|---|---|---|
| CN | 104348580 A | 2/2015 |
| CN | 3071984 A1 | 8/2020 |
| JP | 2024535478 A | 9/2024 |

OTHER PUBLICATIONS

International Search Report for corresponding PCT/CN2022/122216, completed Dec. 28, 2022, with English translation (14 pages).
(Continued)

*Primary Examiner* — Rahel Guarino
(74) *Attorney, Agent, or Firm* — Maginot, Moore & Beck LLP (57) ABSTRACT

A method for determining a resource utilization rate. The method is performed by a network side device, and includes: determining the resource utilization rate by using a total number of physical resource blocks (PRBs) corrected by a layer factor, wherein the layer factor is determined according to PRB usage information of at least one sampling occasion, and the PRB usage information of the at least one (Continued)

sampling occasion at least comprises a number of multiple input multiple output (MIMO) layers used by a PRB in data transmission.

20 Claims, 2 Drawing Sheets

(56) References Cited

OTHER PUBLICATIONS

3GPP, 3rd Generation Partnership Project; Technical Specification Group Radio Access Network;NR;Layer 2 Measurements; (Release 16), 2021. (20 pages).

Office Action for corresponding JP application No. 2024-519804, dated Mar. 11, 2025 (English and Japanese language documents) (6 pages).
CMCC, Introduction of MIMO layer based PRB usage measurement, 3GPP TSG RAN WG2 #111 electronic online, Nov. 2-13, 2020, R2-2010656 (6 pages).
Search Report for corresponding EP application No. 22875013.9, dated Aug. 14, 2025 (11 pages).
China Unicom et al., Discussion on Usage for Mimo, 3GPP TSG-SA5 Meeting #138-e, Aug. 23-31, 2021, S5-214058 (3 pages).
China Unicom et al., Add PRB Usage for MIMO scenario, 3GPP TSG-SA5 Meeting #138-3, Aug. 23-31, 2021, S5-214059 (3 pages).
CMCC, Introduction of MIMO layer based PRB usage measurement, 3GPP TSG-RAN WG2 Meeting #111 electronic, Nov. 2-13, 2020, R2-2010663 (4 pages).

* cited by examiner

METHOD FOR DETERMINING RESOURCE UTILIZATION RATE, COMMUNICATION DEVICE AND STORAGE MEDIUM

CROSS REFERENCE TO RELATED APPLICATIONS

This application is a U.S. national phase application of International Application No. PCT/CN2022/122216, filed on Sep. 28, 2022, which is based on and claims priority to Chinese patent application No. 202111151553.3, filed on Sep. 29, 2021, the entire contents of which are incorporated herein by reference for all purposes.

TECHNICAL FIELD

The embodiments of the disclosure relate to a field of communication technologies, in particular to a method for determining a resource utilization rate, a communication device and a non-instantaneous computer-readable storage medium.

BACKGROUND

Statistics of Physical Resource Block (PRB) utilization rate are usually used to assist operators and network side devices in knowing the PRB utilization rate of each cell, so as to more intuitively obtain the operation condition (e.g., idle or busy) and load condition of each cell. For example, if certain cells are found to be under high load for a long period of time based on the PRB utilization rates of the cells, expansion of the cells or adjustment of network planning can be considered.

Currently, the PRB utilization rate is usually described by the quotient of the number of used PRBs and the total number of PRBs. Space division multiplexing, which can increase transmission speed, has been widely utilized. Space division multiplexing refers to antenna signals of different data streams, frequencies of carriers used by the antenna signals are exactly the same, and spectrum widths used by the antenna signals are also completely overlapped. That is, the space division multiplexing is a technique that allows the same frequency band to be reused in different spaces. Therefore, the data that can be transmitted in the same bandwidth can be multiplied by the space division multiplexing, and the spectrum utilization rate can also be multiplied.

SUMMARY

According to a first aspect of embodiments of the disclosure, a method for determining a resource utilization rate, performed by a network side device, is provided. The method includes:
determining the resource utilization rate by using a total number of PRBs corrected by a layer factor, in which the layer factor is determined according to PRB usage information of at least one sampling occasion, and the PRB usage information of the at least one sampling occasion at least includes a number of multiple input multiple output (MIMO) layers used by a PRB in data transmission.

According to a second aspect of embodiments of the disclosure, a communication device is provided. The communication device includes: a processor, a memory and computer programs stored on the memory and executable by the processor, in which when the computer programs are executed by the processor, the steps in the above method of the first aspect are implemented.

According to a third aspect of embodiments of the disclosure, a computer-readable storage medium having computer programs stored thereon is provided. When the computer programs are executed by a processor, the steps in the above method of the first aspect are implemented.

BRIEF DESCRIPTION OF THE DRAWINGS

In order to explain the technical solutions of the embodiments of the disclosure more clearly, the drawings to be used in the description of the embodiments of the disclosure will be briefly introduced below. Obviously, the drawings in the following description are only some embodiments of the disclosure. For those skilled in the art, other drawings can be obtained based on these drawings without inventive work.

DETAILED DESCRIPTION

The technical solutions in the embodiments of the disclosure are clearly and completely described below with reference to the accompanying drawings in the embodiments of the disclosure. Obviously, the described embodiments are part of the embodiments of the disclosure, not all of them. Based on the embodiments of the disclosure, all other embodiments obtained by those skilled in the art without inventive work fall within the scope of protection of the disclosure.

The terms "first", "second", etc. in the embodiments of the disclosure are used to distinguish similar objects and are not necessarily used to indicate a specific order or sequence. In addition, the terms "including", "comprising" and any variations thereof are meant to cover non-exclusive including, e.g., a process, method, system, product or apparatus comprising a series of steps or units need not be limited to those clearly listed, but may include other steps or units that are not clearly listed or are inherent to the process, method, product or apparatus. In addition, "and/or" is used in the disclosure to indicate at least one of connected objects. For example, for A and/or B and/or C, it indicates 7 cases, i.e., A exists alone, B exists alone, C exists alone, and both A and B exist, both B and C exist, both A and C exist, and A, B and C all exist.

For ease of understanding, some of the elements involved in this disclosure are described below.

Space Division Multiplexing (SDM) refers to allowing the same frequency band to be reused in different spaces. That is, for antenna signals of different data streams, frequencies of carriers used by them are exactly the same, and the spectrum widths used by them are also completely overlapped. Therefore, under the same bandwidth, the amount of transmitted data can be multiplied by SDM, and the spectrum utilization rate can also be multiplied.

The number of MIMO layers: UEs with better channel conditions can be configured with a plurality of MIMO streams, which is equivalent to transmitting multiple copies of data using the same PRB resource. The number of MIMO layers can also be called a number of MIMO streams, a number of space division streams, a number of SDM layers, or a number of scheduled layers. For example, if the number of MIMO layers is 2, the same PRB resource can transmit 2 copies of the data, and if the number of MIMO layers is 3, the same PRB resource can transmit 3 copies of the data.

A number of used PRBs can also be referred to as a number of occupied PRBs or a number of scheduled PRBs. It refers to the number of PRBs used for transmission of Physical Downlink Shared Channel (PDSCH), which can be specifically understood as the number of PRBs scheduled by a current cell for all UEs.

A total number of PRBs is the total number of PRBs configured by the current cell.

The following describes the method for determining a resource utilization rate provided by the embodiments of the disclosure.

Figure 1:
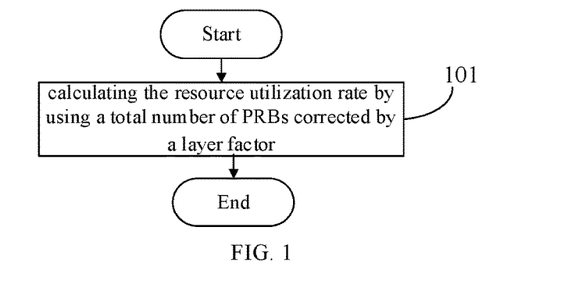
FIG. 1 is a flowchart of a method for determining a resource utilization rate according to an embodiment of the disclosure.

FIG. 1 is a flowchart of a method for determining a resource utilization rate according to an embodiment of the disclosure. As illustrated in FIG. 1, the method is executed by a network side device.

As illustrated in FIG. 1, the method includes the following steps.

At step 101, the resource utilization rate is determined by using a total number of PRBs corrected by a layer factor.

For ease of description, $\beta$ is used to represent the layer factor in this disclosure. The layer factor mentioned above can also be called a multiplexing factor, a modification factor, a multiplication factor, an adjustment factor, a MIMO stream factor, a MIMO layer factor, all of which are used to correct the total number of PRBs, to more accurately determine a total number of actually available PRB resources, which is more in line with an actual condition of the network.

The layer factor $\beta$ is determined according to PRB usage information of at least one sampling occasion, and the PRB usage information of the at least one sampling occasion at least includes the number of MIMO layers used by the PRB in data transmission.

In a specific implementation, the PRB usage information at least includes the number of MIMO layers. When the PRB of the cell is configured with a plurality of MIMO streams, the number of MIMO layers used by the PRB in data transmission is not fixed. The greater the number of MIMO layers, the more data can be transmitted simultaneously by a single PRB, i.e., the greater a degree of availability of the PRB of the cell, and thus different layer factors $\beta$ should be determined. Meanwhile, the cell corresponds to different numbers of MIMO layers in different network environments, and thus different layer factors $\beta$ should be determined.

In the embodiments of the disclosure, $\beta$ is determined based on the PRB usage information of the at least one sampling occasion. That is, $\beta$ is determined based on historical usage information of the PRB. Since the historical usage information can faithfully record the number of MIMO layers used by the PRB in data transmission, it can actually reflect different load statuses and an SDM usage condition of PRBs in different network environments (e.g., a number of UEs, and a strength of communication, etc.). Therefore, the total number of PRBs can be corrected using $\beta$ determined based on the historical usage information of PRB, which can more accurately represent the total number of actually available PRB resources in SDM scenarios, and thus a more accurate resource utilization rate can be obtained.

The PRB usage information may also include other information, such as the number of used PRBs, etc., so that $\beta$ can be determined according to the number of MIMO layers in combination with other usage information, which is not limited herein.

The at least one sampling occasion may include sampling occasions within one time period or sampling occasions within a plurality of time periods. In the case where the at least one sampling occasion includes sampling occasions within a plurality of time periods, the PRB usage information over the plurality of time periods can be combined to more accurately determine the layer factor $\beta$. The sampling occasion may be in the unit of a slot, a symbol, or a subframe, which is not limited herein.

In the embodiments of the disclosure, the layer factor $\beta$ can represent the PRB SDM conditions at different stages depending on the stage at which the collected PRB usage information is located.

The PRB usage information of the at least one sampling occasion can represent the historical usage condition of the PRB of the cell, which can reflect a historical load condition of the cell. The total number of actually available PRB resources in a certain historical time period of the cell is determined according to the layer factor $\beta$.

The PRB usage information of the at least one sampling occasion can also represent a real-time usage condition of the PRB, which reflects the real-time load condition of the cell. The total number of actually available PRB resources by the cell can be determined by the layer factor $\beta$ described above.

The above-mentioned layer factor $\beta$ is a stage-related factor based on historical data statistics, which has a characteristic of varying over time (or can be called as having a dynamic characteristic). The total number of actually available PRB resources corrected by the above layer factor $\beta$ is more in line with the actual condition of the network than a preset static layer factor.

In one case, the layer factor $\beta$ obtained in the various cases described above may be used as a basis for correcting the total number of PRBs in the current stage, so that a current load condition of the cell assessed based on the resource utilization rate is more accurate. In another case, the above layer factor $\beta$ can also be used in the next stage of resource utilization rate assessment.

In an embodiment of the disclosure, the layer factor $\beta$ is determined according to the PRB usage information of the at least one sampling occasion. Since different PRB usage information can be obtained under different load conditions of the cell at the at least one sampling occasion, a dynamic layer factor $\beta$ can be determined. It is understood that in the course of network operation, the layer factor $\beta$ may change according to changes in cell channel conditions, network states, and numbers of users, etc. The total number of PRBs corrected by the dynamic layer factor $\beta$ can more accurately reflect an actual utilization degree of PRB resources of the cell, which is more in line with the actual condition of the network. The accuracy of the calculated resource utilization rate is improved, and an assessment of the load condition of the cell is more accurate.

Optionally, at the at least one sampling occasion, the greater the number of MIMO layers used by the PRB in data transmission, the greater the layer factor $\beta$. That is, the number of MIMO layers is positively correlated with the layer factor $\beta$.

The determination of the layer factor β is explained below.

In a possible implementation, the layer factor β is:

a maximum value of a first set, in which the first set includes at least one average value of MIMO layers, the average value of MIMO layers is an average value of scheduled MIMO layers per PRB or on all the PRBs within a corresponding first period in data transmission; or, an average value of a second set, in which the second set includes at least one maximum value of MIMO layers, the maximum value of MIMO layers is a maximum value of scheduled MIMO layers per PRB or on all the PRBs within the corresponding first period in data transmission.

That is, in the implementation, there are at least two methods for determining the layer factor β. A first method is determining the layer factor β according to a maximum value of the average values of MIMO layers. A second method is determining the layer factor β according to an average value of the maximum values of MIMO layers.

For the sake of illustration, assuming that the at least one sampling occasion is distributed in N sampling time intervals (i.e., the first period as described above), and N is a positive integer. The first set includes N average values of MIMO layers, and one average value of MIMO layers corresponds to one sampling time interval. The second set includes N maximum values of MIMO layers, and one maximum value of MIMO layers corresponds to one sampling time interval. The first time interval may be understood as any sampling time interval of the N sampling time intervals, which is denoted herein as T1, and the first period includes at least one sampling occasion.

The above determination methods are described below respectively.

The first method is determining the layer factor β according to the maximum value of the average values of MIMO layers.

In this method, the specific processes are provided as follows.

At step 1, an average value of MIMO layers corresponding to each sampling time interval is calculated.

Taking the first period as an example, the average value of MIMO layers corresponding to the first period is represented by expression 1:

$$\frac{\sum_{\forall j} \{\text{number of used } PRBs * \text{number of } MIMO \text{ layers}\}}{\sum_{\forall j} \{\text{number of used } PRBs\}}$$

or, expression 2:

$$\frac{\sum_{\forall j} \{\text{number of used } PRBs * \text{number of } MIMO \text{ layers}\}}{\sum_{\forall j} \{\text{number of available } PRBs\}}$$

where, j is a sampling occasion within the first period. A numerator of the above expression 1 or expression 2 can be obtained by first calculating a sum of products of the number of used PRBs corresponding to each sampling occasion and the respective number of MIMO layers, which is denoted as a first sum, and then adding up the first sums of all the sampling occasions within the first period.

A denominator of the above expression 1 can be understood as the sum of the number of used PRBs of all sampling occasions within the first period (when a PRB is reused for n times, the corresponding count of that PRB is n). A denominator of the above expression 2 can be understood as the sum of the numbers of available PRBs of all sampling occasions within the first period.

For ease of understanding, by way of example, it is assumed that the available PRBs at a sampling occasion include PRB1, PRB2 and PRB3. The numbers of MIMO layers corresponding to PRB1, PRB2, and PRB3 are 4, 2, and 0, respectively. The number of used PRBs corresponding to the sampling occasion is 2, and the number of available PRBs corresponding to the sampling occasion is 3.

In practical applications, compared to expression 2, the above expression 1 excludes unused PRBs, so it can more accurately reflect an actual transmission capability of PRBs. The layer factor β is determined based on the average value of MIMO layers obtained by expression 1, which can more accurately reflect an SDM condition of the cell, and the resource utilization rate obtained by statistics can be more accurate.

When the number of available PRBs is selected as the denominator, the average value of MIMO layers can be further described as:

$$\frac{\sum_{\forall j} \sum_{\forall k} \{M_{kj}(T1) * L_{kj}(T1)\}}{\sum_{\forall j} \sum_{\forall k} \{M_{kj}(T1)\}}$$

or, $$\frac{\sum_{\forall j} \sum_{\forall a} \{M_{aj}(T1) * L_{aj}(T1)\}}{\sum_{\forall j} \sum_{\forall a} \{M_{aj}(T1)\}}$$

where, T1 is the first period, j is a sampling occasion within the first period, a is a serial number of a UE, k is a number of kinds of MIMO layers, $M_{kj}(T1)$ is a number of PRBs used for transmission corresponding to a $k^{th}$ kind of MIMO layers at a $j^{th}$ sampling occasion within the first period, $L_{kj}(T1)$ is a number of MIMO layers corresponding to the $k^{th}$ kind of MIMO layers at the $j^{th}$ sampling occasion within the first period, $M_{aj}(T1)$ is a number of PRBs allocated to an $a^{th}$ UE at the $j^{th}$ sampling occasion within the first period, and $L_{aj}(T1)$ is a number of MIMO layers used by the $a^{th}$ UE at the $j^{th}$ sampling occasion within the first period.

The first method of the above two calculation methods is to determine the average value of MIMO layers corresponding to the first period from a perspective of the kind of MIMO layers.

In specific implementation, the kind of MIMO layers, i.e., the value of k, can be predefined globally. That is, the number of MIMO layers that may exist globally can be defined in advance, and all possible values of k can be predefined globally. In this case, the value of $L_{kj}(T1)$ can be defined as the same value at all sampling occasions. In addition, the value of k can also be redefined based on an actual condition of each sampling occasion.

Figure 2:
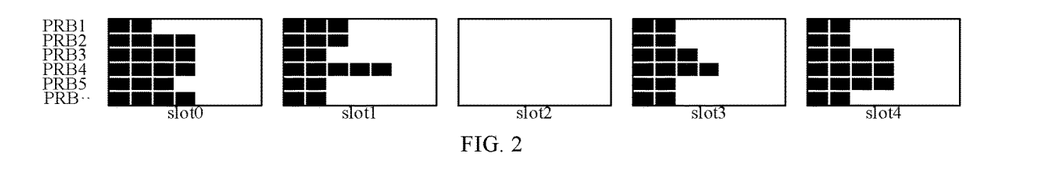
FIG. 2 is a schematic diagram of PRB usage statistics according to an embodiment of the disclosure.

To facilitate understanding, for example, for globally predefined kinds of MIMO layers, it is assumed that the globally predefined numbers of MIMO layers include a total of 6 kinds which is 0, 1, 2, 3, 4, and 5, respectively, and k can take the values of 1, 2, 3, 4, 5, and 6, correspondingly. As shown in FIG. 2, the number of MIMO layers of each RRB is represented by a corresponding number of blocks. In all the sampling occasions, $L_{1j}(T1)=0$, $L_{2j}(T1)=1$, $L_{3j}(T1)=2$, $L_{4j}(T1)=3$, $L_{5j}(T1)=4$, and $L_{6j}(T1)=5$. When each sampling occasion is redefined, as shown in FIG. 2, in the sampling occasion 1 (slot 0), actual numbers of MIMO layers include 2, 3, and 4, which belong to 3 kinds, and k can take the values 1, 2, and 3 respectively. That is, $L_{1j}(T1)=2$, $L_{2j}(T1)=3$, and $L_{3j}(T1)=4$.

As shown in FIG. 2, the first period includes 5 sampling occasions, namely sampling occasion 1 (slot0), sampling occasion 2 (slot1), sampling occasion 3 (slot2), sampling occasion 4 (slot3) and sampling occasion 5 (slot4). The numbers of MIMO layers corresponding to the 5 sampling occasions include 0, 2, 3, 4, and 5, which belong to 5 kinds, and k can take the values of 1, 2, 3, 4, and 5, respectively. When k=1, the corresponding number of MIMO layers is 0. When k=2, the corresponding number of MIMO layers is 2. When k=3, the corresponding number of MIMO layers is 3. When k=4, the corresponding number of MIMO layers is 4. When k=5, the corresponding number of MIMO layers is 5. That is, $L_{1j}(T1)=0$, $L_{2j}(T1)=2$, $L_{3j}(T1)=3$, $L_{4j}(T1)=4$, and $L_{5j}(T1)=5$.

$M_{1j}(T1)$ represents the number of PRBs transmitted in 0 stream at the $j^{th}$ sampling occasion, $M_{2j}(T1)=2$ represents the number of PRBs transmitted in 2 streams at the $j^{th}$ sampling occasion, $M_{3j}(T1)=3$ represents the number of PRBs transmitted in 3 streams at the $j^{th}$ sampling occasion, $M_{4j}(T1)=4$ represents the number of PRBs transmitted in 4 streams at the $j^{th}$ sampling occasion, and $M_{5j}(T1)=5$ represents the number of PRBs transmitted in 5 streams at the $j^{th}$ sampling occasion. Taking slot as an example, $M_{11}(T1)=0$, $M_{21}(T1)=1$, $M_{31}(T1)=1$, $M_{41}(T1)=4$, and $M_{51}(T1)=0$.

The second method of the above two calculation methods is to determine the average value of MIMO layers corresponding to the first period from a perspective of UE.

For ease of understanding, for example, assuming that the current cell is connected to a total of 3 UEs, i.e., UE1, UE2 and UE3, respectively, and a takes the values of 1, 2 and 3, respectively. For example, at the sampling occasion 1 (slot0), the number of PRBs assigned to UE1 is 1, and the number of MIMO layers is 2. That is, $M_{11}(T1)=1$, and $L_{11}(T1)=2$.

At step 2, the maximum value of the average values of MIMO layers in the N sampling time intervals is determined.

The process of step 1 is executed at each sampling time interval, and the average value of MIMO layers corresponding to each sampling time interval can be obtained, and the maximum value of the N average values of MIMO layers is determined as the layer factor β, which can be represented as:

$$\beta = \max\left(\frac{\sum_{\forall j}\sum_{\forall k}\{M_{kj}(T1)*L_{kj}(T1)\}}{\sum_{\forall j}\sum_{\forall k}\{M_{kj}(T1)\}}\right)$$

or, $$\beta = \max\left(\frac{\sum_{\forall j}\sum_{\forall a}\{M_{aj}(T1)*L_{aj}(T1)\}}{\sum_{\forall j}\sum_{\forall a}\{M_{aj}(T1)\}}\right).$$

In this determination method, since the average value of MIMO layers at each sampling time interval is obtained, the maximum value of the average values of MIMO layers is determined as the layer factor β, and then the resource utilization rate can be maximized.

The second determination method is to determine the layer factor β according to an average value of the maximum values of MIMO layers.

The specific process of this determination method is provided as follows.

At step 1, a maximum value of MIMO layers corresponding to each sampling time interval is calculated.

Taking the first period as an example, the maximum value of MIMO layers corresponding to the first period is the maximum value of MIMO layers of at least one sampling occasion within the first period.

For ease of understanding, for example, as shown in FIG. 2, assuming that 5 sampling occasions are included in the first period, namely sampling occasion1 (slot0), sampling occasion2 (slot1), sampling occasion3 (slot2), sampling occasion4 (slot3) and sampling occasion5 (slot4). The maximum value of MIMO layers corresponding to the first period is 5.

At step 2, an average value of the maximum values of MIMO layers at N sampling time intervals is determined.

The process of step 1 is executed at each sampling time interval, and the maximum value of MIMO layers corresponding to each sampling time interval can be obtained. An average value of the N maximum values of MIMO layers can be obtained and determined as the layer factor β.

In this determination method, since the maximum value of MIMO layers at each sampling time interval is obtained, the average value of the maximum values is determined instead of selecting the maximum value from the maximum values of MIMO layers, which avoids overestimation of PRB resources actually used by the cell, and further improves the accuracy of determination of the resource utilization rate.

It should be noted that in addition to the above two determination methods, in an optional implementation, the method for determining the layer factor β may also include the following two ways.

A third determination method is to determine the layer factor β according to an average value of average values of MIMO layers.

That is, the average value of MIMO layers corresponding to each sampling time interval is first calculated, and then an average value of the average values of MIMO layers corresponding to the N sampling time intervals is obtained and determined to be the layer factor β. The specific implementation of the determination method is described with reference to the relevant descriptions of the first determination method and the second determination method described above, and which is repeated herein to avoid repetition.

A fourth determination method is to determine the layer factor β according to a maximum value of maximum values of MIMO layers.

That is, the maximum value of MIMO layers corresponding to each sampling time interval is first calculated, and then a maximum value of the maximum values of MIMO layers corresponding to the N sampling time intervals is determined as the layer factor β. The specific implementation of the determination method is described with reference to the relevant descriptions of the first determination method and the second determination method described above, and which is not repeated herein to avoid repetition.

The determination of the resource utilization rate is described below.

In the embodiment of the disclosure, for ease of illustration, the current time interval whose resource utilization rate needs to be determined is defined as a second period, which is denoted as T2. The second period includes at least one sampling occasion.

In an optional implementation, the second period is the same as the first period. In this way, PRB usage data of the current time period is utilized to calculate the resource utilization rate of the time interval in real time. In this way, the resource utilization rate can be calculated in real time, so that the load condition of the cell assessed based on the resource utilization rate can be more accurate. In another implementation, the second period is different from the first period and may be a time period after the first period. In this way, the PRB usage data of the first period is used to calculate the resource utilization rate of a subsequent time period, so as to reduce amount of computation and simplify network configuration.

In specific implementation, the resource utilization rate can be determined according to the following process.

At step 1, a number of PRBs that are actually occupied by a cell is determined.

When considering the SDM, since one PRB can transmit multiple pieces of data at the same time, the number of PRBs actually occupied by the cell is not necessarily equal to a sum of the numbers of PRBs occupied by each UE in the cell. In detail, the number of PRBs actually occupied by a UE in the cell at a sampling occasion can be a product of the number of PRBs occupied by the UE and a number of actual space division streams of the UE, i.e., a product of the number of PRBs used by the UE and the number of actual MIMO layers of the UE, which is denoted as a second product. The number of PRBs actually occupied by the cell may be a sum of the second products of all UEs of the cell at all sampling occasions within the second period, which can be represented as:

$\Sigma_{\forall a}\Sigma_{\forall i}\{$number of occupied PRBs*number of actual space division streams$\}$;

or, $\Sigma_{\forall a}\Sigma_{\forall i}\{$number of used PRBs*number of actual MIMO layers$\}$;

where, i is a sampling occasion within the second period, a is a serial number of a UE.

At step 2, a total number of PRBs corrected by the layer factor $\beta$ is determined.

In a possible implementation, the total number of PRBs corrected by the layer factor $\beta$ is a product of the layer factor and a total number of available PRBs.

In the implementation, the total number of available PRBs is used to represent a sum of numbers of actually available PRBs at all sampling occasions within the second period. Optionally, the total number of available PRBs is: 1) a product of a number of sampling occasions within the second period and a number of available PRBs at one sampling occasion of the sampling occasions; or, 2) a sum of the numbers of available PRBs at all sampling occasions within the second period.

In the above method 1), the number of available PRBs at the one sampling occasion can be a number of available PRBs corresponding to any sampling occasion within the second period, or may be a number of available PRBs corresponding to the sampling occasion having the largest number of available PRBs within the second period, but the total number of available PRBs determined in this way may belong to an extreme case, which may cause a larger corrected total number of PRBs. The number of available PRBs of which one sampling occasion within the second period can be determined according to actual condition and is not specifically limited herein. Compared to the method 1), the total number of available PRBs obtained in the above method 2) is more accurate.

At step 3, a resource utilization rate of the cell is calculated.

In a specific implementation, the resource utilization rate of the cell=the number of PRBs actually occupied by the cell/the total number of PRBs corrected by the layer factor $\beta$. The number of PRBs actually occupied by the cell is obtained by step 1, and the total number of PRBs corrected by the layer factor $\beta$ is obtained by step 2.

It should be noted that, in the case where the layer factor $\beta$ is determined based on the first determination method, the resource utilization rate of the cell can be represented as:

$$\frac{\sum_{\forall a}\sum_{\forall i}\{\text{number of occupied } PRBs * \text{number of actual space division streams}\}}{(\text{total number of available } PRBs * \text{maximum average value of } MIMO \text{ layers})}$$

where, the maximum average value of MIMO layers is a maximum value of the average values of MIMO layers.

In the case where the layer factor $\beta$ is determined based on the second determination method, the resource utilization rate of the cell can be represented as:

$$\frac{\sum_{\forall a}\sum_{\forall i}\{\text{number of occupied } PRBs * \text{number of actual space division streams}\}}{(\text{total number of available } PRBs * \text{average maximum value of } MIMO \text{ layers})}$$

where, the average maximum value of MIMO layers is an average value of the maximum values of MIMO layers.

For ease of understanding, an example of the process for determining the resource utilization rate is described below.

At step 1, a number of PRBs that are actually occupied by a cell is determined.

Assuming that the second period (T2) includes i sampling occasions and there are a UEs in the cell, the number of PRBs actually occupied by the $a^{th}$ UE at $i^{th}$ sampling occasion is denoted as $M_{ai}(T2)$, and the actual number of MIMO layers of the $a^{th}$ UE at the $i^{th}$ sampling occasion is denoted as $L_{ai}(T2)$. The number of PRBs actual occupied by the cell can be represented as:

$\Sigma_{\forall a}\Sigma_{\forall i}\{M_{ai}(T2)*L_{ai}(T2)\}$.

At step 2, a total number of PRBs corrected by the layer factor $\beta$ is determined.

1) The Layer Factor $\beta$ is Determined.

The layer factor $\beta$ is represented as:

$$\beta = \max\left(\frac{\sum_{\forall j}\sum_{\forall k}\{M_{kj}(T1)*L_{kj}(T1)\}}{\sum_{\forall j}\sum_{\forall k}\{M_{kj}(T1)\}}\right)$$

or, $$\beta = \max\left(\frac{\sum_{\forall j}\sum_{\forall a}\{M_{aj}(T1)*L_{aj}(T1)\}}{\sum_{\forall j}\sum_{\forall a}\{M_{aj}(T1)\}}\right).$$

2) A Total Number of Available PRBs is Determined.

The number of sampling occasions in the second period (T2) is denoted as N(T2), the number of available PRBs corresponding to a selected sampling occasion is denoted as P(T2), and the number of available PRBs corresponding to the $i^{th}$ sampling occasion is denoted as $P_i(T2)$. Thus, the total number of available PRBs is represented as:

$$N(T2)*P(T2)$$

or, $$\Sigma_{\forall i}\{P_i(T2)\}.$$

3) A Total Number of PRBs Corrected by the Layer Factor β is Determined.

The total number of PRBs corrected by the layer factor β is represented as:

$$\beta*N(T2)*P(T2)$$

or, $$\beta*\Sigma_{\forall i}\{P_i(T2)\}.$$

At step 3, the resource utilization rate of the cell is calculated.

The resource utilization rate is represented as:

$$\left\lceil \frac{\sum_{\forall a}\sum_{\forall i}\{M_{ai}(T2)*L_{ai}(T2)\}}{N(T2)*P(T2)*\beta} *100 \right\rceil$$

or, $$\left\lceil \frac{\sum_{\forall a}\sum_{\forall i}\{M_{ai}(T2)*L_{ai}(T2)\}}{\sum_{\forall i}\{P_i(T2)\}*\beta} *100 \right\rceil$$

It should be noted that ⌈ ⌉ in the above expression represents ceiling, and a value range of the resource utilization rate in the above expression is 0 to 100. It can be understood that the value of the described resource utilization rate is not limited thereto, and can be represented using a percentage, i.e., 100 in the expression is replaced with %, without ceiling. What description manner specifically used by the resource utilization rate may be determined according to actual situation, and which is not specifically limited herein.

A calculation expression G of the resource utilization rate can be obtained by bring β into the expression:

$$\left\lceil \frac{\sum_{\forall a}\sum_{\forall i}\{M_{ai}(T2)*L_{ai}(T2)\}}{N(T2)*P(T2)*\max\left(\frac{\sum_{\forall j}\sum_{\forall k}\{M_{kj}(T1)*L_{kj}(T1)\}}{\sum_{\forall j}\sum_{\forall k}\{M_{kj}(T1)\}}\right)} *100 \right\rceil$$

or, $$\left\lceil \frac{\sum_{\forall a}\sum_{\forall i}\{M_{ai}(T2)*L_{ai}(T2)\}}{N(T2)*P(T2)*\max\left(\frac{\sum_{\forall j}\sum_{\forall a}\{M_{aj}(T1)*L_{aj}(T1)\}}{\sum_{\forall j}\sum_{\forall a}\{M_{aj}(T1)\}}\right)} *100 \right\rceil$$

or, $$\left\lceil \frac{\sum_{\forall a}\sum_{\forall i}\{M_{ai}(T2)*L_{ai}(T2)\}}{\sum_{\forall i}\{P_i(T2)\}*\max\left(\frac{\sum_{\forall j}\sum_{\forall k}\{M_{kj}(T1)*L_{kj}(T1)\}}{\sum_{\forall j}\sum_{\forall k}\{M_{kj}(T1)\}}\right)} *100 \right\rceil$$

or, $$\left\lceil \frac{\sum_{\forall a}\sum_{\forall i}\{M_{ai}(T2)*L_{ai}(T2)\}}{\sum_{\forall i}\{P_i(T2)\}*\max\left(\frac{\sum_{\forall j}\sum_{\forall a}\{M_{aj}(T1)*L_{aj}(T1)\}}{\sum_{\forall j}\sum_{\forall a}\{M_{aj}(T1)\}}\right)} *100 \right\rceil$$

It should be noted that, in the embodiments of the disclosure, the average value of MIMO layers or the maximum value of MIMO layers is calculated first, and the layer factor β is calculated, and then the resource utilization rate is calculated. Or, the resource utilization rate is calculated directly by using the expression G, which may be decided according to the actual situation, and which is not be limited herein.

It should be noted that, the steps of the method for determining the resource utilization rate provided by the embodiments of the disclosure may all be performed by a first network node (a base station). Or, a part of the parameters may be determined by the first network node and then sent to a second network node (e.g., a network manager) to obtain the layer factor β through calculation. Afterwards, the second network node sends the layer factor β to the first network node, and the first network node corrects the total number of PRBs according to the layer factor β and calculates the resource utilization rate.

Figure 3:
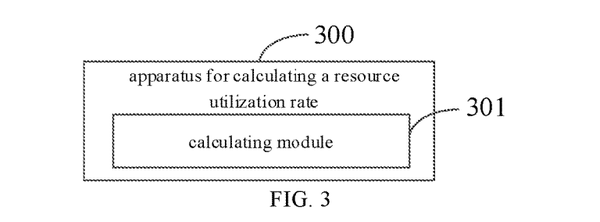
FIG. 3 is a block diagram of an apparatus for determining a resource utilization rate according to an embodiment of the disclosure.

FIG. 3 is a block diagram of an apparatus 300 for determining a resource utilization rate according to an embodiment of the disclosure.

As illustrated in FIG. 3, the apparatus 300 includes:

a determining module 301, configured to determine the resource utilization rate by using a total number of PRBs corrected by a layer factor, in which the layer factor is determined according to PRB usage information of at least one sampling occasion, and the PRB usage information of the at least one sampling occasion at least includes a number of MIMO layers used by a PRB in data transmission.

Optionally, at the at least one sampling occasion, the greater the number of MIMO layers used by the PRB in data transmission, the greater the layer factor.

Optionally, the layer factor is:

a maximum value of a first set, in which the first set includes at least one average value of MIMO layers, the average value of MIMO layers is an average value of scheduled MIMO layers per PRB or on all the PRBs within a corresponding first period in data transmission;

or, an average value of a second set, in which the second set includes at least one maximum value of MIMO layers, the maximum value of MIMO layers is a maximum value of scheduled MIMO layers per PRB or on all the PRBs within the corresponding first period in data transmission.

Optionally, the average value of MIMO layers is:

$$\frac{\sum_{\forall j}\sum_{\forall k}\{M_{kj}(T1)*L_{kj}(T1)\}}{\sum_{\forall j}\sum_{\forall k}\{M_{kj}(T1)\}}$$

or, $$\frac{\sum_{\forall j}\sum_{\forall a}\{M_{aj}(T1)*L_{aj}(T1)\}}{\sum_{\forall j}\sum_{\forall a}\{M_{aj}(T1)\}}$$

where, T1 is the first period, j is a sampling occasion within the first period, a is a serial number of a user equipment (UE), k is a number of kinds of MIMO layers, $M_{kj}(T1)$ is a number of PRBs transmitted using a $k^{th}$ kind of MIMO layers at a $j^{th}$ sampling occasion within the first period, $L_{kj}(T1)$ is a number of MIMO layers corresponding to the $k^{th}$ kind of MIMO layers at the $j^{th}$ sampling occasion within the first period, $M_{aj}(T1)$ is a number of PRBs allocated to an $a^{th}$ UE at the $j^{th}$ sampling occasion within the first period, and $L_{aj}(T1)$ is a number of MIMO layers used by the $a^{th}$ UE at the $j^{th}$ sampling occasion within the first period.

Optionally, the total number of PRBs corrected by the layer factor is a product of the layer factor and a total number of available PRBs.

Optionally, the total number of available PRBs is:
a product of a number of sampling occasions within a second period and a number of available PRBs at one sampling occasion of the sampling occasions;
or,
a sum of the numbers of available PRBs at all the sampling occasions within the second period.

Optionally, the second period is identical to the first period.

The apparatus 300 is capable of realizing the process shown in the method embodiment of FIG. 1, and achieving the same beneficial effects, which is not repeated herein to avoid repetition.

Figure 4:
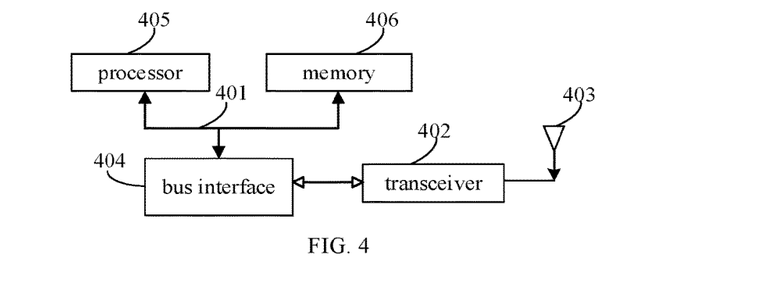
FIG. 4 is a block diagram of a network side device according to an embodiment of the disclosure.

Referring to FIG. 4, FIG. 4 is a block diagram of a network side device according to an embodiment of the disclosure. As illustrated in FIG. 4, the network side device includes: a bus 401, a transceiver 402, an antenna 403, a bus interface 404, a processor 405, and a memory 406.

The processor 405 is configured to determine a resource utilization rate by using a total number of PRBs corrected by a layer factor, in which the layer factor is determined according to PRB usage information of at least one sampling occasion, and the PRB usage information of the at least one sampling occasion at least includes a number of MIMO layers used by a PRB in data transmission.

The network side device is capable of realizing the process shown in the method embodiment of FIG. 1, and achieving the same beneficial effects, which is not repeated herein to avoid repetition.

Figure 5:
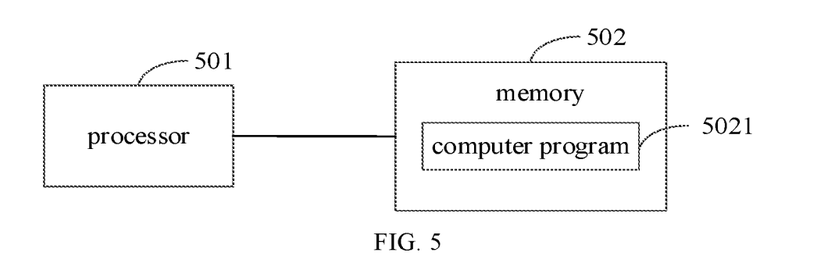
FIG. 5 is a block diagram of a communication device according to an embodiment of the disclosure.

The embodiment of the disclosure also provides a communication device. As illustrated in FIG. 5, the communication device includes: a processor 501, a memory 502, and a program 5021 stored on the memory 502 and executable on the processor 501.

In the case where the communication device is a network side device, when the program 5021 is executed by the processor 501, the steps in the method embodiment corresponding to FIG. 1 can be realized and the same beneficial effects can be achieved, which is not repeated herein to avoid repetition.

Those skilled in the art may understand that all or some of the steps for realizing the method of the above embodiments can be achieved by hardware associated with program instructions, and the programs may be stored in a readable medium. The embodiment of the disclosure also provides a readable storage medium having computer programs stored thereon. When the computer programs are executed by the processor, the steps in the method embodiment corresponding to FIG. 1 can be realized and the same beneficial effects can be achieved, which is not repeated herein to avoid repetition.

The storage medium may be a read-only memory (ROM), a random-access memory (RAM), a diskette or a CD-ROM.

The foregoing is a preferred embodiment of the disclosure, and it should be noted that for those skilled in the art, a number of improvements and embellishments may be made without departing from the principles described in the disclosure, and these improvements and embellishments should also be regarded as within the scope of protection of the disclosure.

What is claimed is:

1. A method for determining a resource utilization rate, performed by a network side device, comprising:
determining the resource utilization rate by using a total number of physical resource blocks (PRBs) corrected by a layer factor, wherein the layer factor is determined according to PRB usage information of at least one sampling occasion, and the PRB usage information of the at least one sampling occasion at least comprises a number of multiple input multiple output (MIMO) layers used by a PRB in data transmission.

2. The method of claim 1, wherein at the at least one sampling occasion, the greater the number of MIMO layers used by the PRB in data transmission, the greater the layer factor.

3. The method of claim 1, wherein the layer factor is:
a maximum value of a first set, wherein the first set comprises at least one average value of MIMO layers, wherein the average value of MIMO layers is an average value of scheduled MIMO layers per PRB or on all the PRBs within a corresponding first period in data transmission;
or,
an average value of a second set, wherein the second set comprises at least one maximum value of MIMO layers, wherein a maximum value of MIMO layers is a maximum value of scheduled MIMO layers per PRB or on all the PRBs within the corresponding first period in data transmission.

4. The method of claim 3, wherein the average value of MIMO layers is:

$$\frac{\sum_{\forall j}\sum_{\forall k}\{M_{kj}(T1)*L_{kj}(T1)\}}{\sum_{\forall j}\sum_{\forall k}\{M_{kj}(T1)\}}$$

or, $$\frac{\sum_{\forall j}\sum_{\forall a}\{M_{aj}(T1)*L_{aj}(T1)\}}{\sum_{\forall j}\sum_{\forall a}\{M_{aj}(T1)\}}$$

where, T1 is a first period, j is a sampling occasion within the first period, a is a serial number of a user equipment (UE), k is a number of kinds of MIMO layers, $M_{kj}(T1)$ is a number of PRBs transmitted using a $k^{th}$ kind of MIMO layers at a $j^{th}$ sampling occasion within the first period, $L_{kj}(T1)$ is a number of MIMO layers corresponding to the $k^{th}$ kind of MIMO layers at the $j^{th}$ sampling occasion within the first period, $M_{aj}(T1)$ is a number of PRBs allocated to an $a^{th}$ UE at the $j^{th}$ sampling occasion within the first period, and $L_{aj}(T1)$ is a number of MIMO layers used by the $a^{th}$ UE at the $j^{th}$ sampling occasion within the first period.

5. The method of claim 1, wherein the total number of PRBs corrected by the layer factor is a product of the layer factor and a total number of available PRBs.

6. The method of claim 5, wherein the total number of available PRBs is:
a product of a number of sampling occasions within a second period and a number of available PRBs at one sampling occasion of the sampling occasions;
or,
a sum of the numbers of available PRBs at all the sampling occasions within the second period.

7. The method of claim 6, wherein the second period is identical to a first period.

8. A communication device, comprising a processor, a memory and computer programs stored on the memory and executable by the processor, wherein the processor is configured to:
determine a resource utilization rate by using a total number of physical resource blocks (PRBs) corrected by a layer factor, wherein the layer factor is determined according to PRB usage information of at least one sampling occasion, and the PRB usage information of the at least one sampling occasion at least comprises a number of multiple input multiple output (MIMO) layers used by a PRB in data transmission.

9. A non-instantaneous computer-readable storage medium having computer programs stored thereon, wherein when the computer programs are executed by a processor, the processor is configured to:
determine a resource utilization rate by using a total number of physical resource blocks (PRBs) corrected by a layer factor, wherein the layer factor is determined according to PRB usage information of at least one sampling occasion, and the PRB usage information of the at least one sampling occasion at least comprises a number of multiple input multiple output (MIMO) layers used by a PRB in data transmission.

10. The communication device of claim 8, wherein at the at least one sampling occasion, the greater the number of MIMO layers used by the PRB in data transmission, the greater the layer factor.

11. The communication device of claim 8, wherein the layer factor is:
a maximum value of a first set, wherein the first set comprises at least one average value of MIMO layers, wherein the average value of MIMO layers is an average value of scheduled MIMO layers per PRB or on all the PRBs within a corresponding first period in data transmission;
or,
an average value of a second set, wherein the second set comprises at least one maximum value of MIMO layers, a maximum value of MIMO layers is a maximum value of scheduled MIMO layers per PRB or on all the PRBs within the corresponding first period in data transmission.

12. The communication device of claim 11, wherein the average value of MIMO layers is:

$$\frac{\sum_{\forall j}\sum_{\forall k}\{M_{kj}(T1)*L_{kj}(T1)\}}{\sum_{\forall j}\sum_{\forall k}\{M_{kj}(T1)\}}$$

or, $$\frac{\sum_{\forall j}\sum_{\forall a}\{M_{aj}(T1)*L_{aj}(T1)\}}{\sum_{\forall j}\sum_{\forall a}\{M_{aj}(T1)\}}$$

where, T1 is a first period, j is a sampling occasion within the first period, a is a serial number of a user equipment (UE), k is a number of kinds of MIMO layers, $M_{kj}(T1)$ is a number of PRBs transmitted using a $k^{th}$ kind of MIMO layers at a $j^{th}$ sampling occasion within the first period, $L_{kj}(T1)$ is a number of MIMO layers corresponding to the $k^{th}$ kind of MIMO layers at the $j^{th}$ sampling occasion within the first period, $M_{aj}(T1)$ is a number of PRBs allocated to an $a^{th}$ UE at the $j^{th}$ sampling occasion within the first period, and $L_{aj}(T1)$ is a number of MIMO layers used by the $a^{th}$ UE at the $j^{th}$ sampling occasion within the first period.

13. The communication device of claim 8, wherein the total number of PRBs corrected by the layer factor is a product of the layer factor and a total number of available PRBs.

14. The communication device of claim 13, wherein the total number of available PRBs is:
a product of a number of sampling occasions within a second period and a number of available PRBs at one sampling occasion of the sampling occasions;
or,
a sum of the numbers of available PRBs at all the sampling occasions within the second period.

15. The communication device of claim 14, wherein the second period is identical to a first period.

16. The non-instantaneous computer-readable storage medium of claim 9, wherein at the at least one sampling occasion, the greater the number of MIMO layers used by the PRB in data transmission, the greater the layer factor.

17. The non-instantaneous computer-readable storage medium of claim 9, wherein the layer factor is:
a maximum value of a first set, wherein the first set comprises at least one average value of MIMO layers, wherein the average value of MIMO layers is an average value of scheduled MIMO layers per PRB or on all the PRBs within a corresponding first period in data transmission;
or,
an average value of a second set, wherein the second set comprises at least one maximum value of MIMO layers, a maximum value of MIMO layers is a maximum value of scheduled MIMO layers per PRB or on all the PRBs within the corresponding first period in data transmission.

18. The non-instantaneous computer-readable storage medium of claim 17, wherein the average value of MIMO layers is:

$$\frac{\sum_{\forall j}\sum_{\forall k}\{M_{kj}(T1)*L_{kj}(T1)\}}{\sum_{\forall j}\sum_{\forall k}\{M_{kj}(T1)\}}$$

or,

-continued $$\frac{\sum_{\forall j}\sum_{\forall a}\{M_{aj}(T1)*L_{aj}(T1)\}}{\sum_{\forall j}\sum_{\forall a}\{M_{aj}(T1)\}}$$

where, T1 is a first period, j is a sampling occasion within the first period, a is a serial number of a user equipment (UE), k is a value of a kind of MIMO layers, $M_{kj}(T1)$ is a number of PRBs transmitted using a $k^{th}$ kind of MIMO layers at a $j^{th}$ sampling occasion within the first period, $L_{kj}(T1)$ is a number of MIMO layers corresponding to the $k^{th}$ kind of MIMO layers at the $j^{th}$ sampling occasion within the first period, $M_{aj}(T1)$ is a number of PRBs allocated to an $a^{th}$ UE at the $j^{th}$ sampling occasion within the first period, and $L_{aj}(T1)$ is a number of MIMO layers used by the $a^{th}$ UE at the $j^{th}$ sampling occasion within the first period.

19. The non-instantaneous computer-readable storage medium of claim 9, wherein the total number of PRBs corrected by the layer factor is a product of the layer factor and a total number of available PRBs.

20. The non-instantaneous computer-readable storage medium of claim 19, wherein the total number of available PRBs is:
  a product of a number of sampling occasions within a second period and a number of available PRBs at one sampling occasion of the sampling occasions;
  or,
  a sum of the numbers of available PRBs at all the sampling occasions within the second period.

* * * * *